United States Patent Office 3,418,392
Patented Dec. 24, 1968

3,418,392
CROSSLINKING COMPOSITIONS COMPRISING A POLYCYCLOALIPHATIC POLYEPOXIDE AND A HEXAALKYLOXYMETHYLAMINO-TRIAZINE FOR ACRYLIC INTERPOLYMERS
George J. Leitner, Peekskill, N.Y., assignor to Geigy Chemical Corporation, Greenburgh, N.Y., a corporation of Delaware
No Drawing. Filed Oct. 21, 1964, Ser. No. 405,572
18 Claims. (Cl. 260—834)

ABSTRACT OF THE DISCLOSURE

A crosslinking agent for a thermosetting interpolymer which interpolymer has at least one reactive monomer such as acrylic present therein, comprising a mixture of a polycycloaliphatic polyepoxide and a 2,4,6-tris[di(lower-alkoxymethyl)amino]-1,3,5-triazine. A preferred combination is hexamethoxymethylmelamine and 3,4-epoxy-6-methylcyclohexylmethyl 3,4 - epoxy-6-methylcyclohexanecarboxylate.

THE INVENTION

The present invention relates to novel crosslinking agents for polymeric compositions, to compositions thus obtained and to methods for the use of such crosslinking agents. More particularly, the present invention pertains to a composition for modifying and improving the properties of crosslinkable interpolymers.

Thermosetting interpolymers are widely used as pigment binders in the decoration of textiles, as binders for nonwoven fabrics, as protective coatings, as adhesives, and in similar applications. The properties of such interpolymers, such as solvent resistance, alkaline and acid wash durability, adhesive characteristics, abrasion resistance, hardness, flexibility and the like are in part controlled both by the constitution and relative amounts of the various monomeric units making up the polymer and by the nature and degree of crosslinking which is present. Generally, crosslinking is achieved by incorporating in the interpolymer at least one reactive monomer unit, such as a reactive acrylic. Reactive monomers are compounds which are not only capable of polymerization but which also exhibit a moiety which, as a pendant group on the resulting interpolymer, is capable of reacting with some other substance so as to effect crosslinking. Such groups are well known and may be hydroxy as in the case of a hydroxyalkyl acrylate; carboxy as in the case of acrylic or methacrylic, fumaric, maleic, or itaconic acid; epoxy as in the case of glycidyl methacrylate; methylolamido as in the case of N-methylolacrylamide; alkoxymethylamido as in the case of an etherified methylolacrylamide; amido as in acrylamide and the like.

These reactive monomers are incorporated in the interpolymer together with various other polymerizable monomers such as acrylonitrile; styrene, vinyl toluene; alkyl acrylates such as ethyl acrylate, butyl acrylate, 2-ethyl-hexyl acrylate, lauryl acrylate and the like; butadiene; vinyl ethers; maleate esters; and the like.

The crosslinking agent of the present invention is a mixture of a polycycloaliphatic polyepoxide and a 2,4,6-tris[di(lower-alkoxymethyl)amino]-1,3,5-triazine of the formula:

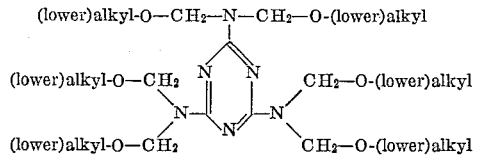

The preferred specie of the latter component is that compound wherein each of the (lower)alkyl groups is methyl, i.e., hexamethoxymethylmelamine, although those compounds having alkyl groups with from 2 to 4 carbon atoms may also be employed.

The polycycloaliphatic polyepoxide component of this invention is a compound characterized by the presence of two or more cyclohexane and/or cyclopentane rings, each of which bears one or more epoxide groups. The preferred compounds of this class are 3,4-epoxy-6-methylcyclohexylmethyl 3,4 - epoxy - 6-methylcyclohexanecarboxylate; 3,4-epoxycyclohexylmethyl 3,4-epoxycyclohexanecarboxylate; bis(3,4 - epoxy-6-methylcyclohexylmethyl)adipate; bis(2,3 - epoxycyclopentyl)ether; 1,2-bis(2,3-epoxycyclopentoxy)ethane; and 3-(3,4-epoxycyclohexyl)-9,10 - epoxy-2,4-dioxaspiro[5.6]undecane. Other polycycloaliphatic polyepoxides which are suitable are those disclosed in the following U.S. patents:

| | |
|---|---|
| 2,716,123 | 2,988,554 |
| 2,750,395 | 3,023,174 |
| 2,853,498 | 3,027,357 |
| 2,853,499 | 3,028,385 |
| 2,863,881 | 3,072,678 |
| 2,991,293 | 3,072,679 |

Each component of the present invention is known for its crosslinking properties. The use of either however, has been limited to only acrylic interpolymers having specific types of pendant groups present. Furthermore while each type is known to impart certain advantageous properties to the final polymeric composition, each is also known to impart other disadvantageous properties. Surprisingly it has been found that a combination of a polycycloaliphatic polyepoxide with from about 10 to about 90% of the above triazine, generally 40 to 60% and preferably about 50%, can be used in a wide variety of interpolymers and results, upon cure, in a crosslinked resinous material far superior in properties to those which can be attributed to the additive properties of the individual compounds. Thus, for example, use of the crosslinking agent of the present invention on interpolymers employed as pigment binders results in superior crockfastness, both wet and dry, with excellent resistance to washing, dry cleaning, and abrasion. In addition this crosslinking agent, when employed in textile applications, actually improves the nature of the textile itself by contributing to its tensile and elongation properties. Superior surface coatings are also obtained through use of this crosslinking composition.

In practice, an interpolymer is prepared according to any of the standard aqueous emulsion polymerization techniques. To the emulsion of the interpolymer is then added and physically combined from about 0.5 to about 30%, preferably 0.5 to 10%, by weight of interpolymer, of an initimate mixture of the polycycloaliphatic polyepoxide and the hexa(lower)alkoxymethylmelamine. Minor amounts of surfactants may also be added to this. Depending upon the specific application of the particular interpolymer, various other ingredients such as pigments and other coloring material, solvents, extenders and the like may also be added.

After application, as to a fabric, the resinous composition is cured. This curing is done in the usual fashion by heat. In contrast to prior crosslinking composition, the present invention utilizes shorter curing cycles at lower curing temperatures. Thus whereas cures have heretofore been effected at temperatures as high as 300° F. for periods of 30 minutes or longer, cures of acrylic interpolymers with the crosslinking agent of the present invention can often be accomplished at temperatures as low as 180° to 220° F. for a period of less than 3 minutes, although higher temperatures can be used. As a result a chemical catalyst is generally not required, although in some applications a latent acid catalyst may be added for even greater acceleration of the cure cycle. Such catalysts include, for example, ammonium chloride, ammonium nitrate, ammonium phosphate, ammonium sulfate, the morpholine salt of p-toluenesulfonic acid, volatile amine salts of mineral acids and the like. This feature is particularly important in the use of this crosslinking composition in the textile arts since many of the synthetics cannot be subjected to the necessary elevated temperature cure cycles without demonstrating discoloration, shrinkage and/or distortion.

The following examples, presented for purposes of illustration and not limitation, will serve to further typify the nature of this invention:

Interpolymer composition

The following represent typical interpolymer compositions for which the crosslinking agent of the present invention may be used. All percentages are by weight:

|  |  | Percent |
|---|---|---|
| (a) | Styrene | 34 |
|  | n-Butyl acrylate | 64 |
|  | Methacrylamide | 2 |
| (b) | Styrene | 42 |
|  | 2-ethylhexyl acrylate | 56 |
|  | N-methylolacrylamide | 2 |
| (c) | Styrene | 40 |
|  | 2-ethylhexyl acrylate | 57 |
|  | 2-hydroxypropyl methacrylate | 3 |
| (d) | Styrene | 42 |
|  | 2-ethylhexyl acrylate | 56 |
|  | Glycidyl methacrylate | 2 |
| (e) | Styrene | 42 |
|  | 2-ethylhexyl acrylate | 55 |
|  | N-methylolacrylamide | 3 |
| (f) | Styrene | 30 |
|  | n-Butyl acrylate | 66 |
|  | Methacylic acid | 2 |
|  | Methacrylamide | 2 |
| (g) | Styrene | 30 |
|  | n-Butyl acrylate | 66 |
|  | Methacrylic acid | 2 |
|  | Glycidyl methacrylate | 2 |
| (h) | Styrene | 42 |
|  | 2-ethylhexyl acrylate | 56 |
|  | Methacrylic acid | 2 |
| (i) | Styrene | 43.5 |
|  | 2-ethylhexyl acrylate | 56.0 |
|  | N-methylolacrylamide | .5 |
| (j) | Styrene | 34.9 |
|  | 2-ethylhexyl acrylate | 14.0 |
|  | n-Butyl acrylate | 49.1 |
|  | Glycidyl methacrylate | 2.0 |
| (k) | Styrene | 25 |
|  | Lauryl acrylate | 70 |
|  | Methacrylic acid | 5 |
| (l) | Styrene | 33 |
|  | 2-ethylhexyl acrylate | 62 |
|  | Hydroxyethyl acrylate | 2 |
|  | Methacrylic acid | 3 |
| (m) | Styrene | 41 |
|  | n-Octyl acrylate | 56 |
|  | Methacrylamide | 3 |
| (n) | Butadiene | 60 |
|  | Styrene | 37 |
|  | Methacrylic acid | 3 |
| (o) | Butadiene | 67 |
|  | Acrylonitrile | 30 |
|  | Methacrylic acid | 3 |
| (p) | Styrene | 70 |
|  | Ethyl acrylate | 22 |
|  | Methacrylic acid | 8 |
| (q) | Vinyl toluene | 42 |
|  | 2-ethylhexyl acrylate | 56 |
|  | 2-hydroxypropyl methacrylate | 2 |
| (r) | Vinyl acetate | 53 |
|  | n-Butyl acrylate | 46 |
|  | Methacrylamide | 1 |
| (s) | Butadiene | 60 |
|  | Styrene | 30 |
|  | Acrylonitrile | 8 |
|  | Methacrylic acid | 2 |
| (t) | Acrylonitrile | 40 |
|  | 2-ethylhexyl acrylate | 58 |
|  | Glycidyl methacrylate | 2 |
| (u) | Methyl methacrylate | 35 |
|  | Ethyl acrylate | 55 |
|  | Acrylic acid | 10 |

Preparation of interpolymers may be accomplished by usual and known techniques. A typical procedure for preparation of acrylic interpolymers involves combining the following ingredients in a reaction vessel:

|  | Parts |
|---|---|
| Deionized water | 98.85 |
| Sodium lauryl sulfate | 1.5 |
| Nonylphenoxypolyethyleneoxyethanol | 1.5 |
| Ammonium persulfate | 0.15 |

This aqueous charge is heated to 75° C. and a substantially equal amount by weight of a mixture of 32.5 parts of styrene, 66.5 parts of n-butyl acrylate and 2.0 parts of methacrylic acid is then added with stirring under a blanket of nitrogen at a uniform rate over a two hour period. During this time the reaction temperature may increase about 5 to 8°. Upon completion of the addition, the reaction mixture is maintained at 85° C. with stirring for one hour. The product is then allowed to cool to room temperature and its pH adjusted to 8.5–9.0 by the addition of aqueous ammonium hydroxide.

EXAMPLE 1

The following represents various crosslinking compositions falling within the present invention:

Crosslinking compositions

|  |  | Percent |
|---|---|---|
| (a) | Hexamethoxymethylmelamine | 90 |
|  | 3,4-epoxy-6-methylcyclohexylmethyl - 2,4-epoxy-6-methylcyclohexanecarboxylate | 10 |
| (b) | Hexamethoxymethylmelamine | 40 |
|  | Bis(3,4-epoxy-6-methylcyclohexyl)adipate | 40 |
|  | "Pluronic" L–61 surfactant | 20 |

| | Percent |
|---|---|
| (c) Hexamethoxymethylmelamine | 50 |
| 3,4-epoxy-6-methylcyclohexylmethyl-3,4 - epoxy-6-methylcyclohexanecarboxylate | 30 |
| Mineral spirits | 20 |

| | Percent |
|---|---|
| (d) Hexamethoxymethylmelamine | 5 |
| 3,4-epoxycyclohexylmethyl 3,4 - epoxycyclohexamecarboxylate | 45 |
| "Pluronic" L-63 surfactant | 20 |
| "Solvesso 100" hydrocarbon solvent | 30 |

| | Percent |
|---|---|
| (e) Hexamethoxymethylmelamine | 40 |
| 3,4-epoxycyclohexylmethyl 3,4 - epoxycyclohexanecarboxylate | 20 |
| "Epoxol" 9-5 epoxidized vegetable oil plasticizer | 20 |
| "Pluronic" L-61 surfactant | 20 |

| | Percent |
|---|---|
| (f) Hexamethoxymethylmelamine | 25 |
| 3,4-epoxy-6-methylcyclohexylmethyl-3,4 - epoxy-6-methylcyclohexanecarboxylate | 35 |
| "Epoxol" 9-5 epoxidized vegetable oil plasticizer | 20 |
| "Igepal" CO-710 surfactant | 20 |

| | Percent |
|---|---|
| (g) Hexaethoxymethylmelamine | 60 |
| Bis(2,3-epoxy - 6 - methylcyclohexylmethyl)adipate | 30 |
| "Pluronic" L-61 surfactant | 10 |

| | Percent |
|---|---|
| (h) Hexamethoxymethylmelamine | 50 |
| 3-(3,4-epoxycyclohexyl)-9,10-epoxy - 2,4 - dioxapiro[5.6]undecane | 40 |
| "Pluronic" L-63 surfactant | 10 |

| | Percent |
|---|---|
| (i) Hexamethoxymethylmelamine | 75 |
| 3,4-epoxycyclohexylmethyl 3,4-epoxycyclohexanecarboxylate | 15 |
| "Pluronic" L-61 surfactant | 10 |

| | Percent |
|---|---|
| (j) Hexamethoxymethylmelamine | 50 |
| 3,4-epoxy-6-methylcyclohexylmethyl-3,4 - epoxy-6-methylcyclohexanecarboxylate | 40 |
| "Pluronic" L-63 surfactant | 10 |

| | Percent |
|---|---|
| (k) Hexamethoxymethylmelamine | 40 |
| 3,4-epoxycyclohexylmethyl-3,4 - epoxycyclohexanecarboxylate | 40 |
| Nonylphenoxypolyethyleneoxyethanol | 20 |

| | Percent |
|---|---|
| (l) Hexamethoxymethylmelamine | 60 |
| 3,4-epoxy-6-methylcyclohexylmethyl-3,4 - epoxy-6-methylcyclohexanecarboxylate | 40 |

EXAMPLE 2

*Print paste.*—A print paste is prepared by thoroughly mixing the following composition:

| | Parts |
|---|---|
| Phthalocyanine blue color concentrate | 20 |
| 42% aqueous emulsion interpolymer (b) | 15 |
| Crosslinking composition (g) | 2 |
| Printing extender | 63 |

Prints are made with above paste on 80 x 80 cotton, a blend of cotton and Dacron polyester and nylon parachute cloth. All are cured at 180° F. for 3 minutes and all exhibit a high brilliance, good handle, exceptional wash fastness in the AATCC No. 3 and 3A wash tests, and very good wet and dry crockfastness.

The above color concentrate is of a composition customary for pigment dispersions. The following is typical:

| | Percent |
|---|---|
| Phthalocyanine blue pigment | 15.0 |
| Water | 57.6 |
| Sodium laurylsulfate | 2.8 |
| Sodium diisopropylnaphthalenesulfate | 2.4 |
| Casein | 1.5 |
| Methyl cellulose, 15 cps. | 1.5 |
| Butylated melamine formaldehyde resin | 7.5 |
| Antifoam agent | 0.2 |
| Xylol | 7.5 |
| Mineral spirits | 4.0 |

An extender as employed above is generally composed of about 46% water, about 52% mineral spirits and 2% of an extender concentrate. The following is typical of such an extender concentrate:

| | Parts |
|---|---|
| Methyl cellulose | 14.0 |
| Mineral spirits and xylol | 23.0 |
| Butylated melamine formaldehyde resin | 12.0 |
| Ammonium laurylsulfate | 7.5 |
| Sodium laurylsulfate | 10.0 |
| Water | 30.0 |
| Ammonium hydroxide | 2.0 |
| Casein | 1.5 |

EXAMPLE 3

*Padding liquor.*—A padding liquor for pigment dyeing is prepared by thoroughly mixing the following:

| | Parts |
|---|---|
| Phthalocyanine green pigment dispersion | 5 |
| 48% aqueous emulsion of interpolymer (b) | 4 |
| Crosslinking composition (j) | .06 |
| 2% aqueous sodium alginate solution | 2.5 |
| 30% aqueous diammonium phosphate | 2.8 |
| Water | 85.7 |

Cotton fabric is padded with this liquor to a pickup of 60% and dry cured at 250° F. for 3 minutes. The resultant green fabric demonstrates excellent wash fastness in the AATCC No. 3A wash test.

EXAMPLE 4

*Print paste.*—A print paste is prepared by thoroughly mixing the following:

| | Parts |
|---|---|
| Azo red color concentrate | 30 |
| 45% aqueous emulsion of interpolymer (d) | 15 |
| Crosslinking composition (e) | 3 |
| Printing extender | 52 |

Roller prints on a blend of cotton and Dacron polyester, and rayon challis with the above paste exhibit excellent fastness properties upon being cured at 190° to 240° F. for 2½ minutes.

EXAMPLE 5

*Nonwoven impregnation dispersion.*—An aqueous impregnation dispersion is prepared by thoroughly blending the following:

| | Parts |
|---|---|
| 40% aqueous emulsion of interpolymer (k) | 40 |
| Crosslinking composition (i) | 1.5 |
| t-Octylphenoxypolyethoxyethanol | 1 |
| Ammonium chloride | 1 |
| Water | 56.5 |

A random web of equal parts of rayon, acetate and nylon weighing 2 oz./yd. is impregnated with the above dispersion and dried for 3 minutes at 310° F. The nonwoven demonstrates about 40% pickup and exhibits a textile hand. It is porous, exceptionally coherent, and possesses a high wet and dry tensile strength.

EXAMPLE 6

*Screen print paste.*—A screen print paste is prepared by thoroughly mixing the following:

| | Parts |
|---|---|
| Carbon black pigment dispersion | 10 |
| 40% aqueous emulsion interpolymer (e) | 10 |
| Crosslinking composition (k) | 1.5 |
| Screen print extender | 78.5 |

Screen prints are made on scoured bleached burlap which is then cured at 180–200° F. for 2 minutes. The print exhibited good wash and drycleaning fastness.

EXAMPLE 7

*Solvent based protective coating.*—A protective coating is prepared by dissolving 70 parts of styrene, 22 parts of ethyl acrylate, and 8 parts of acrylic acid in 50 parts of xylene, together with 1 part each of benzoyl peroxide and tetracylbutyl hydroperoxide and refluxing the solution for 3½ hours.

The resultant copolymer is diluted with 25 parts of xylene and 25 parts of butanol and, after grinding with titanium dioxide pigment, there are added 15 parts of crosslinking agent (j). The nonvolatiles are adjusted to 46% by addition of equal parts of butanol and xylene and a film is drawn on a steel panel from this solution. After baking for 30 minutes at 300° F. this film is infusible, soap resistant and displays excellent flexibility and adhesion.

EXAMPLE 8

*Print paste.*—A print paste is prepared by thoroughly mixing the following:

| | Parts |
|---|---|
| Phthalocyanine green color concentrate | 20 |
| 40% aqueous emulsion of interpolymer (n) | 10 |
| Crosslinking composition (c) | 1.5 |
| Printing extender | 68.5 |

Prints made on acetate jersey and nylon tricot fabrics with this paste are cured at 170 to 190° F. for 2½ minutes. Good to excellent crockfastness is displayed.

EXAMPLE 9

*Flock adhesive.*—A flock adhesive is prepared from the following:

| | |
|---|---|
| 48% aqueous emulsion of interpolymer (l) | 200 |
| Crosslinking composition (l) | 4 |
| High viscosity carboxymethyl cellulose, sodium salt | 2 |

An 80 x 80 cotton base is coated with the above formulation and flocked with ¼ inch nylon staple. After curing for 15 minutes at 310° F., the flocked fabric demonstrates no deflocking when subjected to wash and drycleaning solvent resistance tests.

What is claimed is:

1. A crosslinking composition for an interpolymer of at least one polymerizable monomer selected from acrylonitrile, styrene, vinyl toluene, alkyl acrylate, butadiene, vinyl ethers, and maleate esters and at least one reactive monomer component selected from hydroxyalkylacrylates, acrylic, methacrylic, fumaric, maleic and itaconic acids, glycidyl methacrylate, N - methylolacrylamide, etherified methylolacrylamide and acrylamide, said composition consisting of a mixture of
  (a) a polycycloaliphatic polyepoxide, each cycloaliphatic ring of which contains from 5 to 6 carbon atoms and at least one epoxide group and
  (b) from about 10 to about 90%, by weight of said mixture, of a triazine of the formula:

(lower)alkyl-O—CH$_2$—N—CH$_2$—O-(lower)alkyl
(lower)alkyl-O—CH$_2$ ... CH$_2$—O-(lower)alkyl
(lower)alkyl-O—CH$_2$ ... CH$_2$—O-(lower)alkyl 2. A composition according to claim 1 wherein the triazine is hexamethoxymethylmelamine.

3. A crosslinking composition for an interpolymer of at least one polymerizable monomer selected from acrylonitrile, styrene, vinyl toluene, alkyl acrylate, butadiene, vinyl ethers, and maleate esters and at least one reactive monomer component selected from hydroxyalkylacrylates, acrylic, methacrylic, fumaric, maleic and itaconic acids, glycidyl methacrylate, N - methylolacrylamide, etherified methylolacrylamide and acrylamide, said composition consisting of
  (a) a polycycloaliphatic polyepoxide, each cycloaliphatic ring of which contains from 5 to 6 carbon atoms and at least one epoxide group, and
  (b) from about 40 to about 60%, by weight of said mixture, of hexamethoxymethylmelamine.

4. A composition according to claim 3 wherein the polycycloaliphatic polyepoxide is 3,4 - epoxy - 6 - methylcyclohexylmethyl-3,4 - epoxy - 6 - methylcyclohexanecarboxylate.

5. A composition according to claim 3 wherein the polycycloaliphatic polyepoxide is 3,4 - epoxycyclohexylmethyl-3,4-epoxycyclohexanecarboxylate.

6. A composition according to claim 3 wherein the polycycloaliphatic polyepoxide is bis(3,4-epoxy-6-methylcyclohexylmethyl)adipate.

7. A composition according to claim 3 wherein the polycycloaliphatic polyepoxide is bis(2,3-epoxycyclopentyl)ether.

8. A composition according to claim 3 wherein the polycycloaliphatic polyepoxide is 1,2-bis(2,3-epoxycyclopentoxy)ethane.

9. A composition according to claim 3 wherein the polycycloaliphatic polyepoxide is 3-(3,4 - epoxycyclohexyl)-9,10-epoxy-2,4-dioxaspiro[5.6]undecane.

10. A method for improving the properties of an interpolymer of at least one polymerizable monomer selected from acrylonitrile, styrene, vinyl toluene, alkyl acrylate, butadiene, vinyl ethers, and maleate esters and at least one reactive monomer component selected from hydroxyalkylacrylates, acrylic, methacrylic, fumaric, maleic and itaconic acids, glycidyl methacrylate, N-methylolacrylamide, etherified methylolacrylamide and acrylamide, which comprises
  (a) physically combining with said interpolymer a quantity from about 0.5 to about 30%, by weight of interpolymer, of a mixture consisting of
    (1) a polycycloaliphatic polyepoxide, each cycloaliphatic ring of which contains from 5 to 6 carbon atoms and at least one epoxide group, and
    (2) from about 10 to about 90%, by weight of said mixture, of a triazine of the formula:

(lower)alkyl-O—CH$_2$—N—CH$_2$—O-(lower)alkyl
(lower)alkyl-O—CH$_2$ ... CH$_2$—O-(lower)alkyl
(lower)alkyl-O—CH$_2$ ... CH$_2$—O-(lower)alkyl and
  (b) heating said physical combination at such a temperature and for such a period as to crosslink said interpolymer.

11. The method of claim 10 wherein the triazine is hexamethoxymethylmelamine.

12. A method for improving the properties of an interpolymer of at least one polymerizable monomer selected from acrylonitrile, styrene, vinyl toluene, alkyl acrylate, butadiene, vinyl ethers, and maleate esters and at least one reactive monomer component selected from hydroxyalkylacrylates, acrylic, methacrylic, fumaric, maleic and itaconic acids, glycidyl methacrylate, N-methylolacrylamide, etherified methylolacrylamide and acrylamide, which comprises
  (a) physically combining with said interpolymer quantity from about 0.5 to about 30%, by weight of interpolymer, of a mixture consisting of
    (1) a polycycloaliphatic polyepoxide, each cycloaliphatic ring of which contains from 5 to 6 carbon atoms and at least one epoxide group, and
    (2) from about 40 to about 60%, by weight of said mixture, of hexamethoxymethylmelamine, and
  (b) heating said physical mixture at such a temperature and for such a period as to crosslink said interpolymer.

13. The method of claim 12 wherein the polycycloaliphatic polyepoxide is 3,4 - epoxy - 6 - methylcyclohexylmethyl 3,4-epoxy-6-methylcyclohexanecarboxylate.

14. The method of claim 12 wherein the polycycloaliphatic polyepoxide is 3,4 - epoxycyclohexylmethyl - 3,4-epoxy-cyclohexanecarboxylate.

15. The method of claim 12 wherein the polycycloaliphatic polyepoxide is bis(3,4-epoxy-6-methylcyclohexylmethyl)adipate.

16. The method of claim 12 wherein the polycycloaliphatic polyepoxide is bis(2,3 - epoxycyclopentyl)ether.

17. The method of claim 12 wherein the polycycloaliphatic polyepoxide is 1,2-bis(2,3 - epoxycyclopentoxy) ethane.

18. The method of claim 12 wherein the polycycloaliphatic polyepoxide is 3 - (3,4 - epoxycyclohexyl)-9,10-epoxy-2,4-dioxaspiro[5.6]undecane.

References Cited

UNITED STATES PATENTS

| | | | |
|---|---|---|---|
| 3,105,826 | 10/1963 | Jaggard | 260—834 |
| 2,604,457 | 7/1952 | Segall et al. | 260—80.5 |
| 3,145,207 | 9/1964 | Wohnsiedler | 260—2 |
| 3,182,099 | 5/1965 | Clark et al. | 260—2 |

WILLIAM H. SHORT, *Primary Examiner.*

L. E. PERTILLA, *Assistant Examiner.*

U.S. Cl. X.R.

260—2; 117—161, 139.5; 260—37, 29.1, 29.2